United States Patent Office 3,029,146

Patented Apr. 10, 1962

3,029,146

REPRODUCTION MATERIAL

Maximilian P. Schmidt and Oskar Süs, Wiesbaden, Biebrich, Germany, assignors, by mesne assignments, to Azoplate Corporation, Murray Hill, N.J., a corporation of New Jersey No Drawing. Original application Feb. 17, 1956, Ser. No. 566,093. Divided and this application Apr. 2, 1958, Ser. No. 725,802

Claims priority, application Germany Feb. 25, 1955

12 Claims. (Cl. 96—49)

The present invention concerns the production of copies from originals. More particularly, it is concerned with the production of a material comprising a support layer coated with a light sensitive water soluble or water swellable colloid layer.

For several decades, papers and foils which were light sensitized by means of diazo compounds have been in use in the graphic arts. They are widely used for the reproduction of drawings and other transparent originals. Many attempts have been made in the photo-reproduction field to replace the chromates, which, in combination with water soluble colloids, are used in a series of technically important processes, e.g. in copper intaglio printing, zinc plate printing, offset printing, photo-lithographic processes, and in the production of pigment papers. Recently, suggestions have been made to replace the chromates used in offset printing, by higher molecular diazo compounds.

However, in those diazotype processes in which water soluble colloids must be used for the production of tanned images, e.g. for making collotypes or for the copper intaglio printing process, chromates are still used, in spite of their being poisonous and having other disadvantages.

It is one object of the present invention to provide a novel reproduction material consisting of a layer support and a light sensitive, water soluble or water swellable colloid layer coated thereon, free from chromates, which can be used for the production of tanned images.

A further object of the invention is the use of certain quinone diazides in a colloid layer coated on a base material to produce tanned images upon exposure to a light image.

The light sensitive substances to be used according to this invention in the colloid layers are sulfonic or carboxylic acids, and the salts of such sulfonic or carboxylic acids of p-quinone-diazide sulfonic acid esters, the esters containing two or more p-quinone-diazide sulfo ester groups in their molecules. The colloid being the most important component of the novel reproduction material, these light sensitive substances are mostly used in a minor amount as compared with the amount of colloid in the colloid layer. The major portion of the layer is in general the colloid. Layers containing more than 60% of the light sensitive substance are not within the scope of this invention.

The reproduction material prepared according to the present invention, after it is exposed under a transparent original and developed by treatment with water, results in tanned images which are very suitable for numerous purposes in the reproduction field.

Heretofore it was known that neither the ortho- and para-benzoquinone-diazide sulfonic acids and para-naphthoquinone-diazide sulfonic acids, nor the sulfonic acids of o-quinone-diazide esters or o-quinone-diazide sulfonic acid amides (even if they contained several light sensitive o-quinone diazide residues in their molecules)

were capable of hardening water soluble colloids to such a degree that suitable tanned images are obtained by light exposure and subsequent development with water. It was, therefore, very surprising to determine that the specific group of bis-compounds of the invention could accomplish the purpose.

The compounds, which must be present as the light sensitive substance in the colloidal layer, can be mixed with various water soluble or water swellable colloids and then be used for the production of light sensitive layers, by coating the solution onto a suitable support, in a manner similar to the way known chromate layers are made.

Colloids suitable for use in accordance with the present invention are either natural colloids, such as gelatine or casein; or synthetic colloids, e.g. highly viscous polyvinyl pyrrolidones, acrylic acid amides, polyvinyl alcohol, or similar water soluble or water swellable substances. Dyestuffs, sensitizers, pigments or plasticizers, e.g. glycerine, may be added to the colloid layers, as well as other additives customarily used in diazotype processes.

According to one method of the present invention, a water swellable colloid layer, e.g. a gelatine or cellulose hydrate layer, is sensitized by coating it with a solution of the compound to be used as the light sensitive substance.

One method of producing the light sensitive substance in the colloid layer is, for example, by causing p-quinone-diazide sulfonic acid chlorides to react with aromatic hydroxy-sulfonic acids or hydroxy carboxylic acids containing two or more hydroxy groups in their aromatic nucleus. Alternatively, the sulfonic acids and carboxylic acids of p-nitro-hydroxy-aryl sulfonic acid esters which are prepared by known methods, are first reduced to the corresponding p-amino-hydroxy compounds and then transformed into the sulfonic acids and carboxylic acids of p-quinone-diazide-sulfonic acid esters by diazotization.

If the visibility of the tanned images of the invention, obtained after exposure to light, should not be good enough, they can be colored before or after development with water by using dyestuff solutions of, e.g. basic dyestuffs, such as methylene blue or methyl violet. Frequently, a further hardening of the images results from such coloration. However, such hardening effect may also be obtained by an after-treatment with a tanning agent, e.g. formaldehyde.

Suitable base materials or supports for the light sensitive colloid layers may be: paper, films, plastic foils, metal foils, metal plates and metal cylinders, e.g. of aluminum, zinc, copper or brass or they may be of glass or textile fabrics.

The light sensitive reproduction material according to the present invention may be used for all processes in which chromates were hitherto used for sensibilization, especially for intaglio and offset printing. It is also of practical importance in obtaining pigment images, copying originals, or for the production of stencils.

The light sensitive layers according to the present invention have an excellent shelf life. As compared with the diazo and nitro compounds previously proposed for the production of tanned images, the new material has the advantage that it bleaches out more strongly, thus avoiding weakness in contrast of the images obtained.

The following examples are inserted in order to illustrate the present invention in the light of said examples. No restriction of the scope of the invention to the subject matter described in the example is intended.

(1)

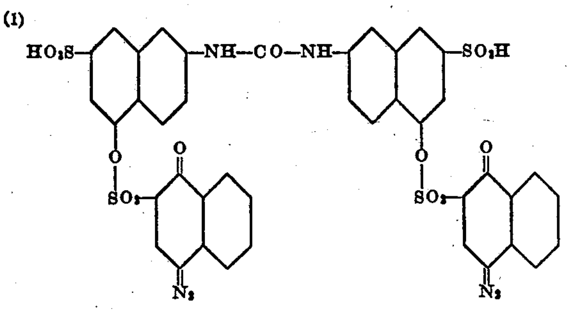

(2)

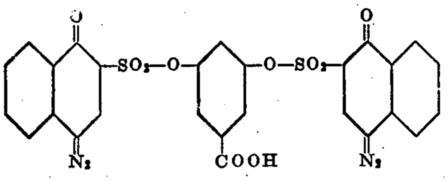

(3)

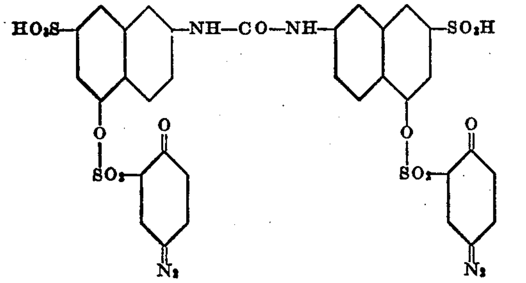

*Example 1*

A 1% solution of the sodium salt of the diazo compound corresponding to Formula 1 (condensation product of 1 mol of N,N'-bis-(5-hydroxy-7-sulfonic acid naphthyl-(2))-urea with 2 moles of naphthoquinone-(1,4)-diazide-(4)-2-sulfonic acid) in a 1:1 mixture of glycol monoethyl ether and dimethyl formamide, is coated as a thin layer onto a superficially saponified cellulose actate foil. The layer side of the foil is then dried and exposed under a negative original. By developing the exposed layer with water, to which about 10% of alcohol may be added, a positive image is obtained which accepts greasy ink and may be used for printing.

The diazo compound corresponding to Formula 1 is prepared as follows:

2.74 g. of the sodium salt of N,N'-bis-(5-hydroxy-7-sulfonic acid-naphthyl-(2))-urea are dissolved in warm water. To this solution there are added, first a suspension of 2.7 g. of naphthoquinone-(1,4)-diazide-(4)-2-sulfochloride in 20 cc. of dioxane, and then, at about 45–50° C., about 12 cc. of a 10% sodium carbonate solution. After a short time, a yellowish, amorphous product begins to precipitate, while the crystalline naphthoquinone-(1,4)-diazide-(4)-2-sulfochloride disappears. After approximately one hour, the condensation is finished. After the reaction mixture has cooled down, the precipitate is drawn off, carefully washed with cold water, and then dried; first on a clay plate, then at about 45° C. in a drying oven. The weakly yellow diazo compound thus obtained may be recrystallized from aqueous alcohol. It is very stable and, when heated, only chars at temperatures above 300° C. In a dilute sodium hydroxide solution, it couples with phloroglucinol to form a violet dyestuff. The compound does not couple with other diazo compounds, and this fact supports the conclusion that both hydroxyl groups of the urea derivative have been esterified.

By means of the sodium salt of the diazo compound corresponding to Formula 1, not only water swellable colloid layers, e.g. of cellulose hydrate (as described above) but also water soluble colloids, such as e.g. highly viscous polyvinyl pyrrolidone, may be processes to light sensitive layers which upon exposure under a positive image yield tanned images. After washing with water, the images may be used for printing in the customary manner.

*Example 2*

A solution containing 0.15% of the bis-naphthoquinone-(1,4)-diazide-(4)-2-sulfonic acid ester of 3,5-dihydroxybenzene-1-carboxylic acid and 1.5% of highly viscous polyvinyl pyrrolidone, dissolved in aqueous alcohol (80%), is by means of a plate whirler coated onto a roughened aluminium or zinc plate. After drying, the layer side of the plate is exposed under a transparent original, colored with a 3% solution of methylene blue, rinsed with water, and dried. A blue colored tanned image is obtained.

The diazo compound corresponding to Formula 2 is prepared by neutralizing $\frac{1}{200}$ mol of 1,3,5-resorcylic acid in 10 cc. of water with dilute sodium hydroxide solution. To this solution there is added a suspension of $\frac{1}{100}$ mol of naphthoquinone-(1,4)-diazide-(4)-2-sulfochloride in 12 cc. of dioxane. While heating the reaction mixture to 30–40° C., sodium carbonate is slowly added until the reaction becomes alkaline; at the same time the diazo compound dissolves slowly. Water is added to the reaction solution to obtain twice its former volume, and then the solution filtered. By adding hydrochloric acid to the filtrate the diazo compound is precipitated. It corresponds to Formula 2, and after drying, forms a reddish powder, which in dilute sodium carbonate solution, yields a brownish-yellow solution.

*Example 3*

0.15 g. of the diazo compound corresponding to Formula 3 is suspended in 85 cc. of 50% aqueous alcohol and then dissolved by neutralizing with sodium bicarbonate. The solution is then combined with 15 cc. of a 10% aqueous solution of highly viscous polyvinyl pyrrolidone, and filtered. The solution mixture is coated as a thin layer onto an aluminum foil, then dried and then exposed under a transparent original. The exposed layer is colored with a basic dyestuff, e.g. methyl violet, and treated with water. This causes the unexposed parts of the colloid layer to be removed from the foil. A colored negative image of the original is obtained, and now the imaged foil may be used as a printing plate in an offset printing process.

The diazo compound corresponding to Formula 3 is prepared as follows:

50 g. of the symmetrical urea of 2-amino-5-hydroxy-naphthalene-7-sulfonic acid, i.e. N,N'-bis-(5-hydroxy-7-sulfonic acid-naphthyl-(2))-urea, are dissolved in a mixture consisting of 900 cc. of water and 200 cc. of 10% sodium carbonate solution. After heating this solution to 90° C., 60 g. of 1-chloro-4-nitrobenzene-2-sulfochloride are added. The reaction product precipitates and is dissolved by adding some alcohol. When the reaction solution has cooled down, the sodium salt of the bis-sulfonic acid ester of the urea compound of 2-amino-5-hydroxy-naphthalene-7-sulfonic acid with 1-chloro-4-nitrobenzene-2-sulfonic acid, precipitates as a microscrystalline mass.

40 g. of this bis-ester are dissolved in 200 cc. of dimethyl formamide. 80 cc. of anhydrous sodium acetate are added to the solution and the mixture is then heated for 10 hours to 110° C., while stirring. The dimethyl formamide is then filtered off under reduced pressure and the residue is dissolved in 250 cc. of water. The solution is carefully acidified by adding 50% sulfuric acid. The solution is then cooled, whereupon the bis-ester of the urea compound of 2-amino-5-hydroxy-naphthalene-7-sulfonic acid with 1-hydroxy-4-nitrobenzene-2 sulfonic acid, precipitates. It is purified by dissolving it in hot water, to which as much of a 10% sodium carbonate solution is added as is necessary to render the solution weakly alkaline. The sodium salt of the bis-ester separates from the hot solution in the form of a yellow microcrystalline precipitate.

This sodium salt of the nitro compound is converted into the corresponding bis-ester of 1-hydroxy-4-aminobenzene-3-sulfonic acid with N,N'-bis-(5-hydroxy-7-sulfonic acid-naphthyl-(2))-urea by catalytically reducing it, using Raney nickel as a catalyst. By diazotizing the amino compound in a hydrochloric solution, the bis-ester of benzoquinone-(1,4)-diazide-(4)-2-sulfonic acid with the urea compound of 2-amino-5-hydroxy-naphthalene-7-sulfonic acid (i.e. the compound corresponding to Formula 3) is obtained in the form of a brown yellow powder.

This application is a division of application Serial No. 566,093, filed February 17, 1956.

What is claimed is:

1. Light-sensitive material comprising a base material coated with a layer comprising a water swellable organic colloid and a compound having the formula $$R—SO_2—O—R_2—O—SO_2—R_1$$

in which R and $R_1$ are quinone-(1,4)-diazide radicals, and $R_2$ is a linking group in which the sulfonic acid ester groups are linked directly to an arylene group substituted by at least one radical selected from the group consisting of $—SO_3H$ and —COOH, there being not in excess of two arylene radicals and the linkage between two arylene radicals being —NH—CO—NH—.

2. Light-sensitive material comprising a base material coated with a layer comprising a water swellable organic colloid and a compound having the formula

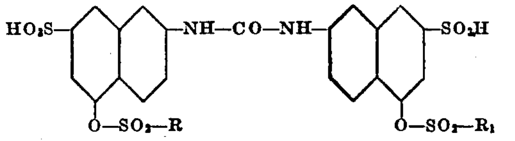

in which R and $R_1$ are quinone-(1,4)-diazide radicals.

3. Light-sensitive material comprising a base material coated with a layer comprising a water swellable organic colloid and a compound having the formula

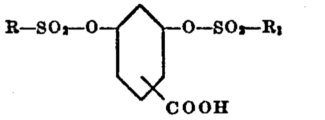

in which R and $R_1$ are quinone-(1,4)-diazide radicals.

4. Light-sensitive material comprising a base material coated with a layer comprising a water swellable organic colloid and a compound having the formula

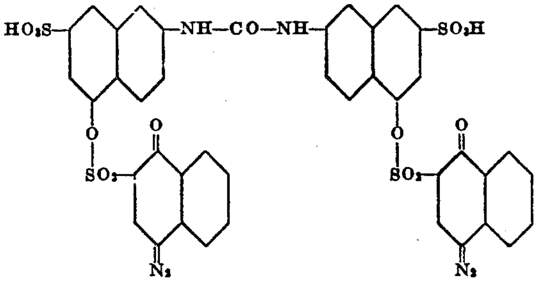

5. Light-sensitive material comprising a base material coated with a layer comprising a water swellable organic colloid and a compound having the formula

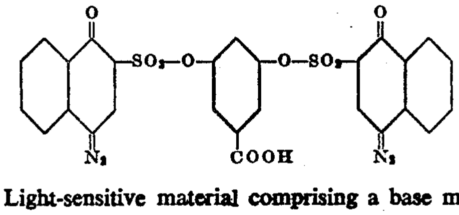

6. Light-sensitive material comprising a base material coated with a layer comprising a water swellable organic colloid and a compound having the formula

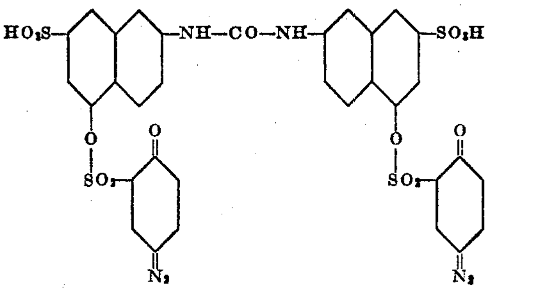

7. A method of developing light-sensitive material which comprises exposing a base material coated with a layer comprising a water swellable organic colloid and a compound having the formula $$R—SO_2—O—R_2—O—SO_2—R_1$$

in which R and $R_1$ are quinone-(1,4)-diazide radicals, and $R_2$ is a linking group in which the sulfonic acid ester groups are linked directly to an arylene group substituted by a least one radical selected from the group consisting of $—SO_3H$ and —COOH, there being not in excess of two arylene radicals and the linkage between two arylene radicals and the linkage between two arylene radicals being —NH—CO—NH— to light under a master, and treating the light exposed plate with water.

8. A method of developing light-sensitive material which comprises exposing a base material coated with a layer comprising a water swellable organic colloid and a compound having the formula

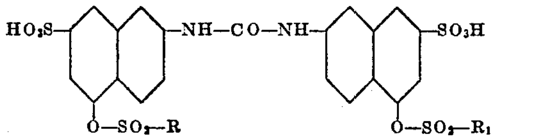

in which R and $R_1$ are quinone-(1,4)-diazide radicals, to light under a master, and treating the light exposed plate with water.

9. A method of developing light-sensitive material which comprises exposing a base material coated with a layer comprising a water swellable organic colloid and a compound having the formula

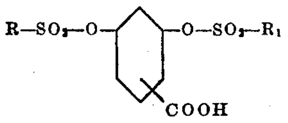

in which R and $R_1$ are quinone-(1,4)-diazide radicals, to light under a master, and treating the light exposed plate with water.

10. A method of developing light-sensitive material which comprises exposing the base material coated with a layer comprising a water swellable organic colloid and a compound having the formula

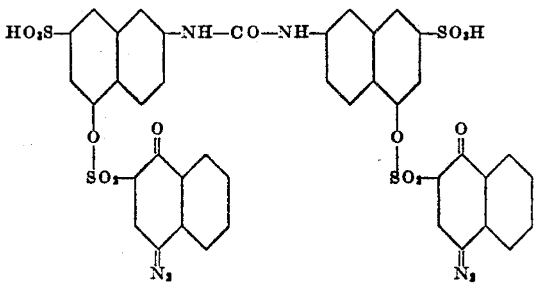

to light under a master, and treating the light exposed plate with water.

11. A method of developing light-sensitive material which comprises exposing a base material coated with a layer comprising a water swellable organic colloid and a compound having the formula

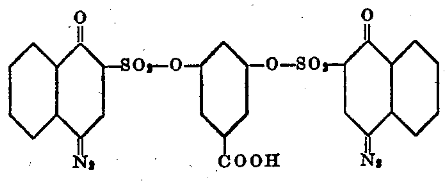

to light under a master, and treating the light exposed plate with water.

12. A method of developing light-sensitive material which comprises exposing a base material coated with a layer comprising a water swellable organic colloid and a compound having the formula

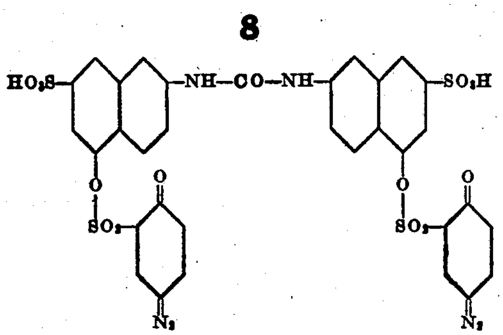

to light under a master, and treating the light exposed plate with water.

References Cited in the file of this patent

UNITED STATES PATENTS 2,754,209 Schmidt et al. ............ July 10, 1956

FOREIGN PATENTS 706,028 Great Britain ............ Mar. 24, 1954